(12) United States Patent
Zhou (10) Patent No.: US 12,188,601 B2
(45) Date of Patent: Jan. 7, 2025

(54) CABLE MANAGEMENT DEVICE AND RELATED INSTALLATION METHOD

(71) Applicant: Chengli Li, Suzhou (CN)

(72) Inventor: Junwu Zhou, Suzhou (CN)

(73) Assignee: Chengli Li, Suzhou (CN)

( * ) Notice: Subject to any disclaimer, the term of this patent is extended or adjusted under 35 U.S.C. 154(b) by 91 days.

(21) Appl. No.: 18/190,825

(22) Filed: Mar. 27, 2023

(65) Prior Publication Data

US 2024/0288096 A1 Aug. 29, 2024

(51) Int. Cl.
*F16L 5/02* (2006.01)
*H02G 3/08* (2006.01)
*H02G 3/22* (2006.01)

(52) U.S. Cl.
CPC ................ *F16L 5/02* (2013.01); *H02G 3/083* (2013.01); *H02G 3/22* (2013.01)

(58) Field of Classification Search
CPC .............. F16L 5/02; H02G 3/083; H02G 3/22
See application file for complete search history.

(56) References Cited

U.S. PATENT DOCUMENTS

| | | | | |
|---|---|---|---|---|
| 5,416,271 A * | 5/1995 | Birmingham | ............ | H02G 3/22 174/657 |
| 7,005,579 B2 * | 2/2006 | Beele | ....... | H02G 3/22 174/152 G |
| 7,355,130 B2 * | 4/2008 | Holman | ............... | H02G 3/088 174/152 G |
| 7,806,374 B1 * | 10/2010 | Ehmann | ................. | H02G 3/22 174/64 |
| 8,093,513 B2 * | 1/2012 | Elm | ....... | F16L 5/08 174/72 A |
| 8,314,350 B1 * | 11/2012 | Gretz | ........ | H02G 3/14 174/67 |
| 8,348,204 B2 * | 1/2013 | Kataoka | ................. | B61D 49/00 248/68.1 |
| 8,963,010 B2 * | 2/2015 | Sprenger | ............... | H02G 3/083 174/152 G |
| 10,298,001 B2 * | 5/2019 | Nowastowski-Stock | ................. | H02G 1/06 |
| 10,574,048 B2 * | 2/2020 | Nowastowski-Stock | ................. | H02G 3/0406 |
| 11,271,382 B2 * | 3/2022 | Ehmann | ................. | H02G 3/22 |
| 2021/0328420 A1 * | 10/2021 | Liu | ..... | H02G 15/013 |

* cited by examiner

*Primary Examiner* — Monica E Millner
(74) *Attorney, Agent, or Firm* — Chen Yoshimura LLP (57) ABSTRACT

A cable management device adapted to be installed in an installation hole of a building unit to pass a cable. The device includes a base frame assembly, adapted to be installed to the building unit around the installation hole, the base frame assembly defining an opening adapted to be aligned with the installation hole; and an inner support frame assembly, affixed to the base frame assembly, including a flexible diaphragm adapted for passing the cable, the flexible diaphragm covering the opening of the base frame assembly. The cable management device can reduce the amount of exposed cables, making it more convenient to clean and organize the cables and improving aesthetics.

17 Claims, 6 Drawing Sheets

| Step 210: Providing a base frame assembly having an opening, and installing the base frame assembly into a building unit via an installation hole which is designed for cables to pass through, where the opening is aligned with the installation hole |

↓

| Step 220: Affixing an inner support frame assembly to the base frame assembly; where the inner support frame assembly includes a flexible diaphragm for allowing the cable to pass through, and the flexible diaphragm closes the opening of the base frame assembly. |

CABLE MANAGEMENT DEVICE AND RELATED INSTALLATION METHOD

BACKGROUND OF THE INVENTION

This invention relates to cable installation, and in particular, it relates to cable management devices, such as for routing and managing communication cables and power cables for electronic devices.

In a building interior environment, electronic devices positioned near building elements (e.g. walls or other installation surfaces) typically require wired connections using cables (e.g. communication cables and power cables) to connect to multiple other devices. Often, these cables are exposed outside of the building elements. Such arrangements can be disorderly and unattractive, and the cables can form knots and collect dust, making them difficult to clean and tidy up.

Figure 1:
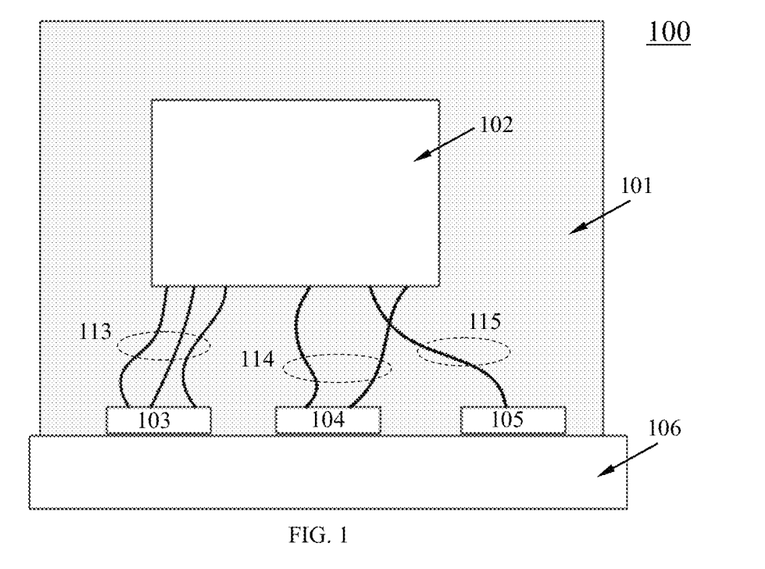
FIG. 1 schematically illustrates an exemplary home installation scenario.

For example, FIG. 1 illustrates an exemplary home installation scenario 100, where a television 102 is mounted on a wall 101 and connected to multiple other devices 103-105 which are placed, for example, on a piece of furniture 106. For example, the television 102 may be connected to a set-top box 103 via cables 113 to obtain programming content, connected to a video output device 104 (e.g. DVD player, video game device, karaoke device, etc.) via cables 114 to obtain entertainment content, connected to a networking device 105 via cables 115 to obtain network service, etc. As shown in FIG. 1, these cables 113-115 are typically exposed outside of the wall and can arbitrarily cross each other, making them disorderly and unattractive.

In current technology, some buildings have pre-installed cable wiring conduits within walls, which are typically used to run cables for illumination devices, power receptacles, air conditioning equipment, weak current circuits, etc. But such pre-installed internal conduits cannot solve the problem of the scenario 100 illustrated in FIG. 1. Because of the cables involved in the scenario 100 or similar scenarios have numerous standards, sizes, lengths, numbers, positions and directions, and because the locations of the various electronic devices 103-105 can also vary, it is difficult to use pre-installed internal conduits to route these cables. This is because the numbers and locations of the pre-installed internal conduits are usually fixed, and the number and types of their connection interfaces are often limited. For example, RJ45 network interfaces are typically directly connected to exchanged equipment at fixed locations; RJ11 telephone interfaces are typically provided at a few fixed locations; power receptacles are provided at fixed locations and connected to the electric meters. Internal conduits are typically not used to route power cables. Power cords for some other appliances such as air conditioning units, lights, etc. are typically exposed. Moreover, once a cable is run through pre-installed internal conduits, it is inconvenient to change them, making it difficult to replace and maintain the cables. Further, in current embedded wirings, the switch boxes and receptacle boxes are embedded in the wall, with only the faceplates exposed on the wall; they do not allow cables to pass through the faceplate, and it is inconvenient to replace the pre-installed cables.

In Chinese utility model patent No. ZL201620088529.8 discloses a wall-mounted function board connector having cable passages, which includes a number of wall-mounted base units disposed adjacent to each other, and function boards connected to the base units. The base units have hollow interior spaces connected to the spaces around the base unit, and the function boards are provided with cable passages, to form continuous cable routing channels between adjacent base units and between base units and function boards. This structure allows cables to be hidden in the hollow spaces and to pass to the outside through the cable passages; this avoids having to form holes on the wall to route the cables, but requires such function board connectors to be installed in the wall.

SUMMARY OF THE INVENTION

Embodiments of the present invention provide a cable management device and related installation methods to solve the above described problems.

In one aspect, the present invention provides a cable management device adapted to be installed in an installation hole of a building unit to pass a cable, the cable management device including: a base frame assembly, adapted to be installed to the building unit around the installation hole, the base frame assembly defining an opening adapted to be aligned with the installation hole; and an inner support frame assembly, affixed to the base frame assembly, the inner support frame assembly including a flexible diaphragm adapted for passing the cable, the flexible diaphragm covering the opening of the base frame assembly.

Based on the first aspect, the cable management device may include one or more of the following features alone or in combination.

In some embodiments, the base frame assembly includes: a base frame defining the opening; and a plurality of installation knobs coupled to the base frame, wherein the installation knobs are rotatable with respect to the base frame and are configured to affix the base frame to the installation hole of the building unit.

In some embodiments, each installation knob is rotatable between a first position and a second position, wherein in the first position, the installation knob extends beyond an edge of the base frame, and in the second position, the installation knob is within the edge of the base frame.

In some embodiments, the installation knobs are a pair of claws disposed opposite to each other.

In some embodiments, the base frame assembly further includes a plurality of connectors, wherein each connector passes through the base frame and is connected to a corresponding one of the plurality of connectors, and is configured to drive the connector to rotate.

In some embodiments, the base frame further includes a plurality of blocking members, wherein each blocking member is disposed to stop further rotation of a corresponding one of the installation knobs with respect to the base frame, wherein when the installation knob is at a position that abuts the corresponding blocking member, the installation knob extends beyond the edge of the base frame and is configured to be driven by the corresponding connector to move in an axial direction of the connector.

In some embodiments, the base frame further includes a plurality of positioning holes, configured to position the cable management device on a surface of the building unit.

In some embodiments, the inner support frame assembly includes: an inner support frame having an opening; and a plurality of connectors configured to affix the inner support frame to the base frame; wherein the flexible diaphragm is formed on the inner support frame by at least one of removeable coupling, welding, adhering, or overmolding to cover the opening of the inner support frame.

In some embodiments, the flexible diaphragm defines a flexible opening configured to allow the cable to pass through.

In some embodiments, the flexible opening includes cut slits.

In some embodiments, the flexible opening is formed of a flexible material and is deformable.

In some embodiments, the flexible opening includes flexible blades which are biased to closed positions to close the flexible opening and allow the cable to pass through.

In some embodiments, the cable management device further includes: a faceplate which defines an opening to expose the flexible diaphragm, wherein the inner support frame assembly is sandwiched between the base frame assembly and the faceplate.

In a second aspect, the present invention provides a method for installing a cable management device, which includes: (a) providing a base frame assembly having an opening, and installing the base frame assembly into a building unit via an installation hole which is configured for cables to pass through, wherein the opening is aligned with the installation hole; and (b) affixing an inner support frame assembly to the base frame assembly, wherein the inner support frame assembly includes a flexible diaphragm configured to allow the cable to pass through, and the flexible diaphragm closes the opening of the base frame assembly.

In some embodiments, step (a) includes: (a1) providing a base frame which has the opening; and (a2) coupling a plurality of installation knobs to the base frame, and rotating the installation knobs with respect to the base frame to affix the base frame to the installation hole of the building unit.

In some embodiments, step (a2) includes passing a plurality of connectors through the base frame and connecting them to the installation knobs, and turning the connectors to drive the installation knobs to rotate.

In some embodiments, step (a) further includes: providing a plurality of blocking members on the base frame, where the blocking members are configured to stop further rotation of the installation knobs with respect to the base frame; rotating the connectors to rotate the installation knobs to positions abutting the blocking members, where the installation knobs extend outside of the side edges of the base frame; and while the installation knobs are at positions abutting the blocking members, further rotating the connectors to move the installation knobs in an axial direction of the connectors.

In some embodiments, the inner support frame assembly includes an inner support frame having an opening, and wherein the flexible diaphragm is formed on the inner support frame by at least one of mounting, welding, adhering, and overmolding methods, to cover the opening of the inner support frame; and wherein affixing the inner support frame assembly to the base frame assembly includes connecting the inner support frame to the base frame by a plurality of connectors.

In some embodiments, the method further includes: affixing a faceplate to the base frame assembly or the inner support frame assembly, wherein the inner support frame assembly is sandwiched between the base frame assembly and the faceplate, and wherein an opening of the faceplate exposes the flexible diaphragm.

Compared to existing technology, the cable management device according to embodiments of the present invention can be installed at installation holes in building units, allowing cables to pass through flexible diaphragms to make connections, such as connecting to electrical devices or power receptacles, which significantly reduces the amount of exposed cables, facilitating cleaning and management of the cables and improving aesthetics.

BRIEF DESCRIPTION OF DRAWINGS

Preferred embodiments of the present invention are described with reference to the drawings. These drawings explain the embodiments and their operating principle, and only illustrate structures that are necessary to the understanding of the invention. These drawings are not to scale. In the drawings, like features are designated by like reference symbols.

DETAILED DESCRIPTION OF THE INVENTION

Preferred embodiments of the present invention are described below with reference to the drawings. These drawings and descriptions explain embodiments of the invention but do not limit the invention. The described embodiments are not all possible embodiments of the present invention. Other embodiments are possible without departing from the spirit and scope of the invention, and the structure and/or logic of the illustrated embodiments may be modified. Thus, it is intended that the scope of the invention is defined by the appended claims.

Figure 2:
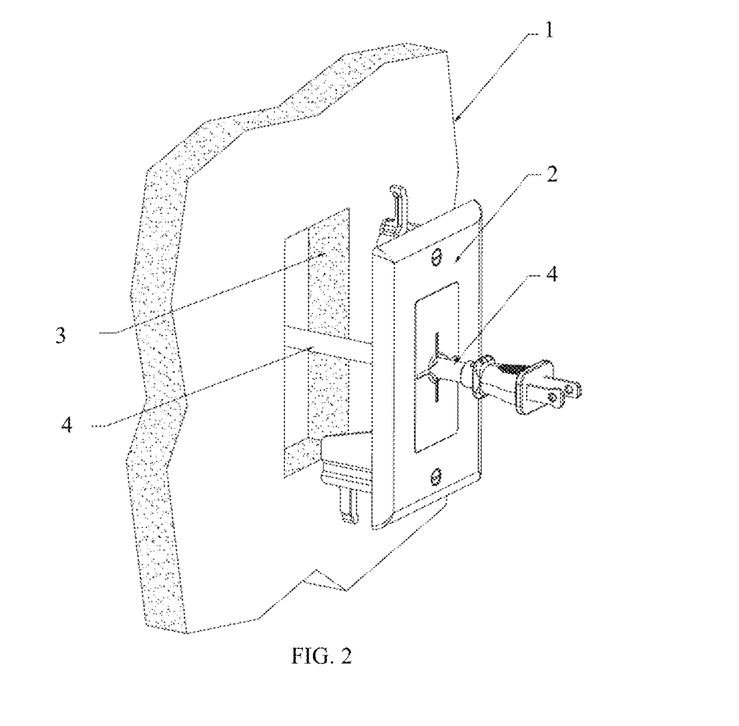
FIG. 2 is a front perspective exploded view that illustrates a cable management device according to an embodiment of the present invention, showing a cable passing through the cable management device and a building unit.

Refer to FIG. 2, which is a front perspective exploded view that illustrates a cable management device 2 according to an embodiment of the present invention, showing a cable 4 passing through the cable management device 2 and a building unit 1. The building unit 1, which may be a building wall or other installation surface, such as a protective wall panel, decorative plate, ceiling, etc., has an installation hole 3 for the cable 4 to pass through. One end of the cable 4 extends inwardly through the installation hole 3; the other end of the cable 4 extends outwardly through the cable management device 2. The cable 4 may be, for example, a communication cable, power cable, or any other cable such as cables 113-115 shown in FIG. 1. The structure of the cable management device 2 is described in detail below with reference to FIGS. 3-7.

Figure 3:
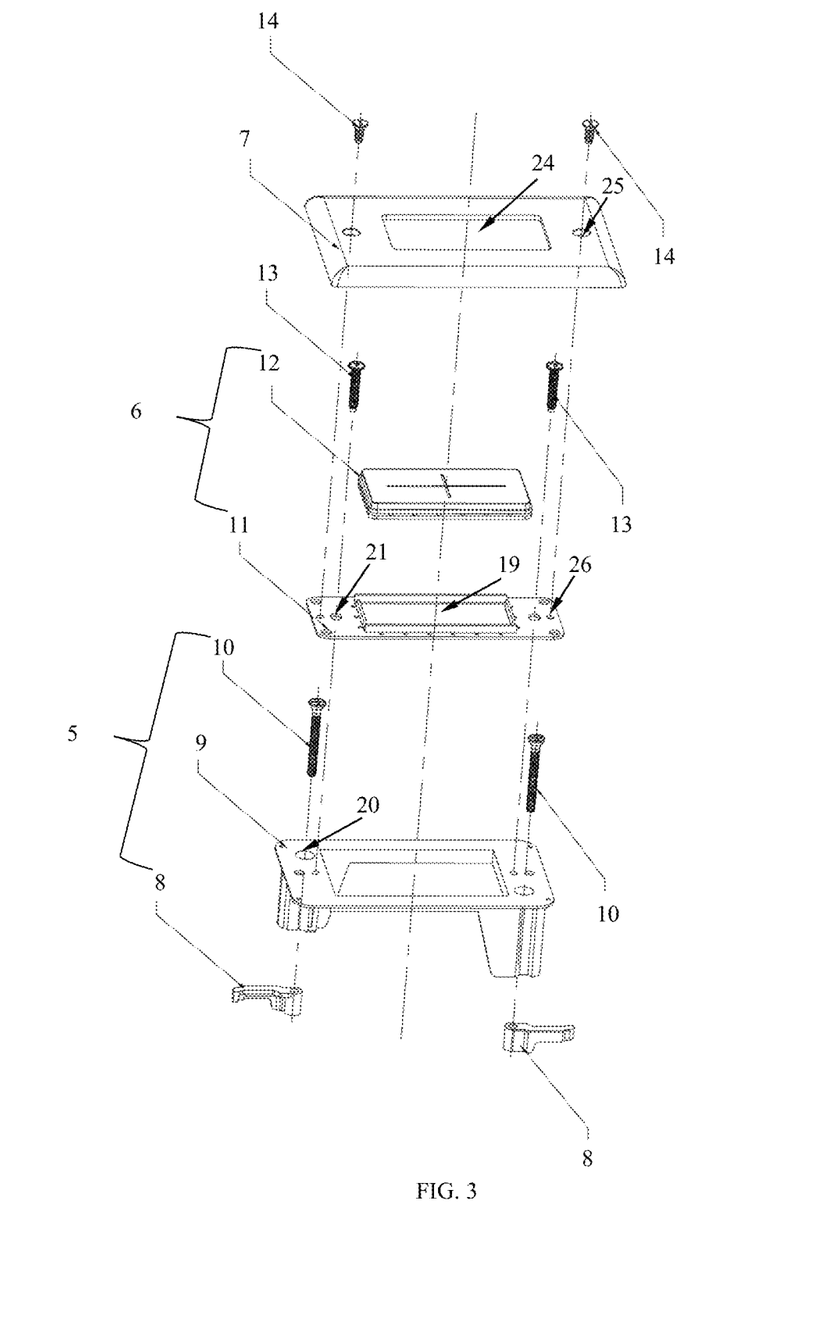
FIG. 3 is an exploded view of the cable management device of FIG. 2.
Figure 4:
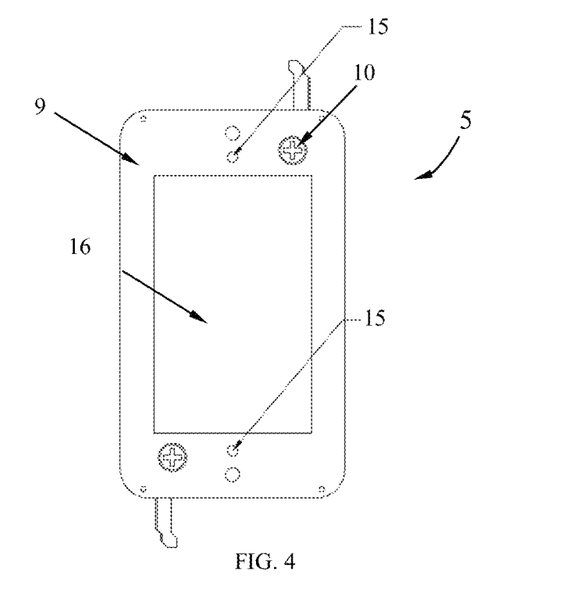
FIG. 4 is a front view of the base frame assembly of the cable management device.
Figure 5:
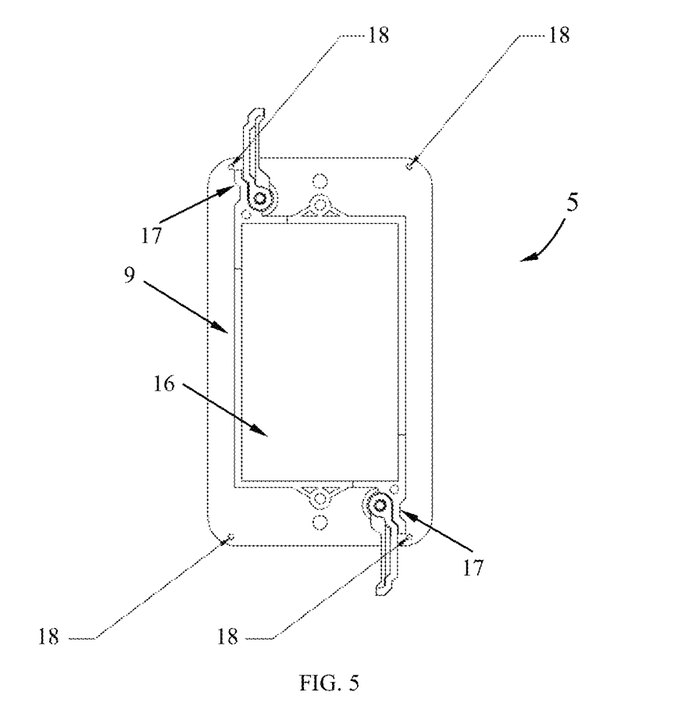
FIG. 5 is a rear view of the base frame assembly of the cable management device.
Figure 6:
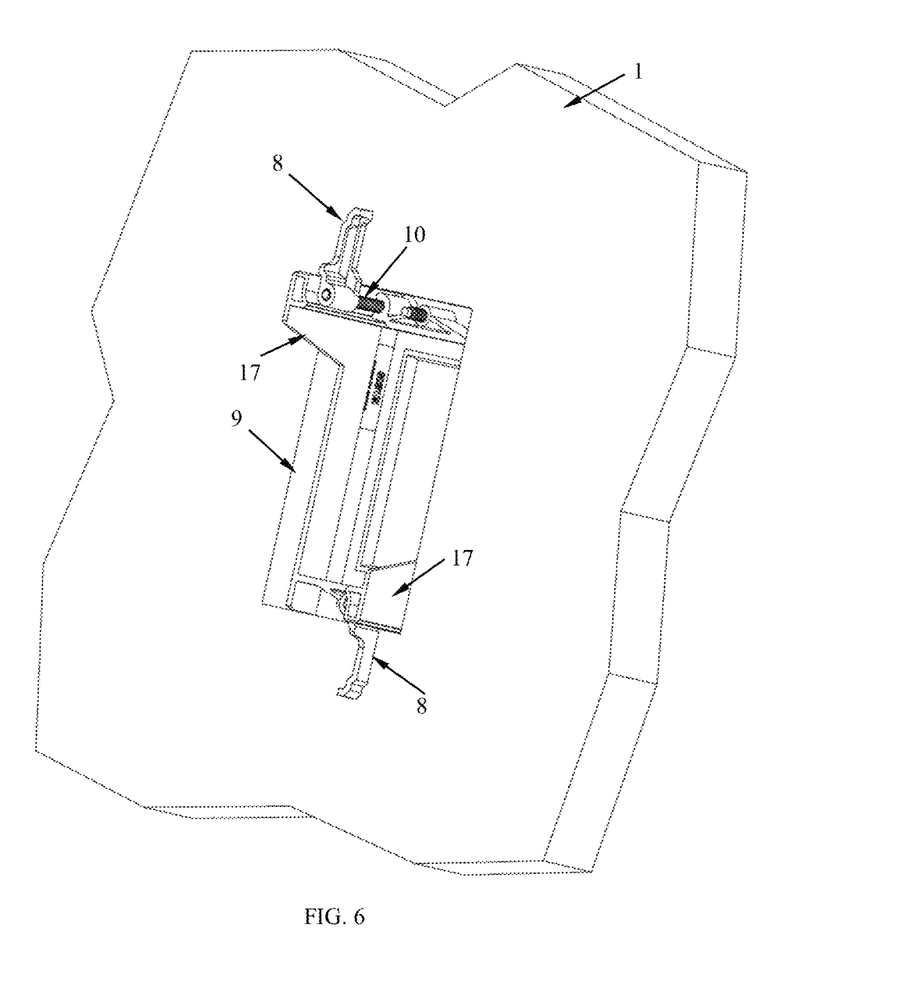
FIG. 6 is a rear perspective view of the cable management device installed on a building unit.
Figure 7:
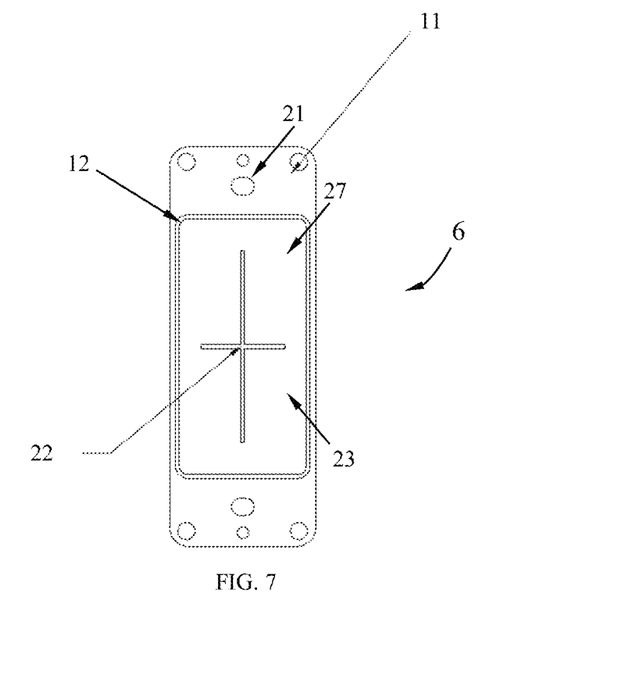
FIG. 7 illustrates the inner support frame assembly of the cable management device.

FIG. 3 is an exploded view of the cable management device 2 of FIG. 2; FIG. 4 is a front view of the base frame assembly 5 of the cable management device; FIG. 5 is a rear view of the base frame assembly 5; FIG. 6 is a rear perspective view of the cable management device 2 installed on the building unit 1; and FIG. 7 illustrates the inner support frame assembly 6 of the cable management device.

As shown in FIGS. 2, 3, 5 and 6, the cable management device 2 includes a base frame assembly 5 and an inner support frame assembly 6 mounted on the base frame assembly 5. The base frame assembly 5 is configured to be installed on the building unit 1 around the installation hole 3, and defines an opening 16 aligned with the installation hole 3. The inner support frame assembly 6 includes a flexible diaphragm 12 with slits, which covers the opening 16 but allows the cable 4 to pass through. The cable management device 2 can prevent the cables arbitrarily crossing each other or knotting, and prevents dust accumulation, making it easier to manage (e.g. replace or maintain) the cables and to clean the environment.

As shown in FIGS. 2-6, the base frame assembly 5 includes a base frame 9 having the opening 16, and installation knobs 8 coupled to the base frame 9. The installation knobs 8 are rotatable with respect to the base frame 9, and are configured to affix the base frame assembly 5 to the installation hole 3 of the building unit 1. The opening 16 extends from a first side (e.g., the front side or the first surface, see FIG. 4) of the base frame 9 to a second side (e.g., the back side or the second surface, see FIG. 5). The installation knobs 8 are disposed on the second side of the base frame 9, and are rotatable with respect to the base frame 9 around axes that extend from the first side to the second side of the base frame 9. Each installation knob 8 may rotate to multiple positions, including a first position and a second position, where in the first position, the arm of the installation knob 8 extends beyond an edge of the base frame 9 (see FIGS. 2 and 4-6), and in the second position, the installation knob 8 stays inside of the edges of the base frame 9 (not shown in the drawings). When installing the base frame assembly 5 in the installation hole 3 of the building unit 1, by rotating the installation knobs 8 to the first positions, the base frame assembly 5 (and hence the cable management device 2) is affixed to the installation hole 3 and prevented from falling out. Conversely, by rotating the installation knobs 8 to the second positions, the base frame assembly 5 (and hence the cable management device 2) may be removed from the installation hole 3 for purposes of maintenance or replacement. For a base frame 9 where the opening 16 is located at the center, the installation knobs 8 are preferably located in the periphery region of the base frame 9.

The base frame 9 may be formed by, for example and without limitation, at least one of the following materials: plastic, metal, composite material, their combinations, etc., to provide a support function.

In some embodiments, the installation knobs 8 are claws (see FIGS. 2-6) disposed at multiple locations, and their numbers may be two or more, so long as they can securely install and affix the base frame in the installation hole 3.

As shown in FIG. 2, the base frame assembly 5 further includes connectors 10, which pass through the base frame 9 and connect to the installation knobs 8. Each connector 10 passes through a through hole 20 that extends from the first side to the second side of the base frame 9, such that one end of the connector 10 is located on the first side of the base frame 9 or in the through hole 20, and the other end of the connector 10 is located on the second side of the base frame 9 to connect to the installation knob 8. The connectors 10 can drive the installation knobs 8 to rotate. For example, each connector 10 and corresponding installation knob 8 may be threadedly coupled to each other, where the connector 10 may have outer threads and the installation knob 8 may have a hole with inner threads, so that the outer and inner threads cooperate with each other to drive the installation knob 8 to rotate with respect to the base frame 9. Optionally, the through holes 20 in the base frame 9 may also have inner threads that cooperate with the threads of the connectors 10, which makes the connection between the connectors 10 and the base frame 9 more secure. The connectors 10 may be, for example and without limitation, screws, bolts, or other fasteners. Each connector 10 may have a position limiting part to prevent the whole connector 10 from passing through the base frame 9, i.e., to limit the further movement of the connector 10 toward the second side of the base frame 9. The position limiting part may be a protruding rim which cooperates with a step of the corresponding through hole 20 to limit the further movement of the connector 10 toward the second side of the base frame 9. Each connector 10 may have a head that includes grooves that allow tools such as screw drivers to turn and tighten the connector 10; the grooves may be a cross shape (see FIG. 4), single linear groove, hollow hexagon, quincunx, hollow pentagon, etc. In some embodiments, the head functions as the position limiting part.

As shown in FIGS. 5 and 6, the base frame 9 may further include positioning holes 18 which may be used when cutting the installation hole 3 on the building unit 1. For example, marks may be formed on the building unit 1 using a pencil through the positioning holes 18; marking lines may then be made on the building unit based on the marks to denote the position where the installation hole 3 should be formed. Four positioning holes 18 are shown in the illustrated embodiment for forming a rectangular shaped installation hole 3, but other numbers may be used, such as two or three holes, for forming round, oval, triangular, rectangular, etc. installation holes 3.

As shown in FIGS. 3, 5 and 6, the base frame 9 further includes blocking members 17 to block further rotation of the installation knobs 8 with respect to the base frame 9. In the illustrated embodiment, the blocking members 17 are protrusions on the second side of the base frame 9. When the installation knobs 8 rotate to abut the blocking members 17 (see FIG. 5), the arms of the installation knobs 8 extend beyond the edges of the base frame 9 so as to affix the base frame assembly 5 (and hence the cable management device 2) to the installation hole 3 and prevent it from falling out. Also, when the installation knobs 8 rotate to abut the blocking members 17, the blocking members 17 prevent the installation knobs 8 from rotating further; after this, when the connectors 10 are turned further by the tool, the rotations of the connectors 10 cause the installation knobs 8 to move along the rotation axes due to the cooperating threads, so that the installation knobs 8 moves toward the base frame 9, until they contact and press against the inner surface of the building unit 1, thereby completing the installation of the base frame assembly 5 in the installation hole 3 of the building unit 1. More specifically, when the distances between the installation knobs 8 and base frame 9 are decreased by the turning of the connectors 10, the installation knobs 8 move toward the inner surface of the building unit 1, so as to affix the base frame 9 (and hence the cable management device 2) to the installation hole 3. Moreover, by turning the connectors 10 in the opposite direction until the arms of the installation knobs 8 move to inside the edges of the base frame 9 (i.e. the installation knobs 8 are moved to their second positions), the base frame 9 may be removed from the installation hole 3 to facilitate replacement or maintenance of the cables or the cable management device 2.

As shown in FIG. 3, the inner support frame assembly 6 includes an inner support frame 11 having an opening 19, and the flexible diaphragm 12 is coupled to the inner support frame 11 and covers the opening 19. The coupling of the flexible diaphragm 12 to the inner support frame 11 may be by removeable connection means such as friction cooperation, interference fitting, snap connections, fasteners, clamps, etc., by welding, by adhering with adhesives, by integral formation such as overmolding, etc. By affixing or integrally forming the flexible diaphragm 12 on the inner support frame 11, the flexible diaphragm 12 is secure and will not become loose.

The inner support frame 11 may be formed of one or more of the following materials: plastic, metal, composite materials, their combinations, etc. to provide a support function.

The inner support frame 11 is affixed to the base frame 9 by connectors 13 (see FIG. 3). Each connector 13 passes through a hole 21 that extends from a first side to a second side of the inner support frame 11, such that one end of the connector 13 is located on the first side of the inner support frame 11 or in the hole 21, and the other end of the connector 13 is located on the second side of the inner support frame 11 to connect to the base frame 9. The base frame 9 has holes 15 for receiving the connectors 13. The holes 15 are aligned with the holes 21 of the inner support frame 11 to easily receive the connectors 13. The connectors 13 may be, without limitation, screws, bolts, pins, or other similar fasteners. The connectors 13 may connect the inner support frame 11 and the base frame 9 using a threaded connection, where the connectors 13 have outer threads, and the holes 15 of the base frame 9 may have inner threads, so that the connectors 13 pass through the holes 21 of the inner support frame 11 and the outer threads of the connectors 13 cooperate with the inner threads of the holes 15 of the base frame 9, so as to affix the inner support frame 11 to the base frame 9.

It should be understood that while FIG. 3 shows two connectors 13, there may be more or fewer connectors 13 so long as they can achieve the mounting and fixing functions.

As shown in FIGS. 2, 3 and 7, the flexible diaphragm 12 may define a flexible opening 27 which allows the cable 4 to pass. The flexible opening 27 may include cut slits, such as multiple linear slits that intersect at the center (e.g., intersecting narrow slits) forming a star shaped opening or other shaped openings. FIG. 7 shows an example of two perpendicular intersecting linear slits forming a cross shaped opening 22. Such openings reduces the resistance for the cables passing through the opening, making it easier to insert and remove the cables. The flexible opening 27 is formed of a flexible material, which is deformable to allow the cable 4 to pass through. For example, when not in use, the flexible opening 27 is closed (see FIG. 7); when in use, as the cable 4 is initially passing through the flexible opening 27, the flexible opening 27 is pushed by the head of cable 4 and is deformed to allow the cable 4 to pass through (FIG. 2). After the cable head passed through, the flexible opening 27 can almost return to the closed state to close the flexible opening 27, e.g., to close the opening around the cable 4, thereby preventing water, dust, insects or other small animals, or other contamination or foreign objects from entering the building unit 1 via the flexible diaphragm 12, to protect the cable 4 from contamination or damage. The flexible opening may include elastic blades 23, where the slit openings (e.g. the above mentioned intersecting narrow slits) are formed between the elastic blades 23. In the relaxed state (not in use), the elastic blades 23 are normally closed and substantially seal the flexible opening 27 of the flexible diaphragm 12. When an object such as the cable 4 is pushed into the flexible opening 27, the flexible opening 27 expands to adapt to the shape of the cable 4, and typically closely contacts the cable 4, tending to surround the cable 4 to close the flexible opening 27. Thus, the elastic blades 23 can be biased to the closed position to close the flexible opening 27 while allowing the cable 4 to pass through.

As shown in FIGS. 2 and 3, the cable management device 2 further includes a faceplate 7, which defines an opening 24 to expose the flexible diaphragm 12. The inner support frame assembly 6 is sandwiched between the base frame assembly 5 and the faceplate 7. The faceplate 7 covers the outer peripheral regions of the flexible diaphragm 12, and serves to protect the base frame assembly 5 and inner support frame assembly 6, for example, against external impacts or to achieve further sealing and isolation, e.g., to prevent water and dust from entering, to provide insulation, to provide fire retardation, etc.

In some embodiments, similar to the connectors 13, the faceplate 7 may be affixed to the inner support frame 11 by connectors 14 (see FIG. 3), so as to sandwich the inner support frame assembly 6 between the base frame assembly 5 and faceplate 7. Each connector 14 passes through a hole 25 that extends from a first side to a second side of the faceplate 7, such that one end of the connector 14 is located on the first side of the faceplate 7 or in the hole 25, and the other end of the connector 14 is located on the second side of the faceplate 7 to connect to the inner support frame 11. The inner support frame 11 has holes 26 for receiving the connectors 14. The holes 25 of the faceplate 7 are aligned with the holes 26 of the inner support frame 11 to easily receive the connectors 14. The connectors 14 may be, without limitation, screws, bolts, pins, or other similar fasteners.

In some embodiments, the faceplate 7 may be coupled to the base frame 9 or inner support frame 11 by connectors, so that the inner support frame assembly 6 is sandwiched between the base frame assembly 5 and the faceplate 7.

In some embodiments the faceplate 7 may be affixed to the base frame 9 or the inner support frame 11 by other coupling, connecting or cooperation means such as friction fitting, interference fitting, snaps, clamps, etc., so as to sandwich the inner support frame assembly 6 between the base frame assembly 5 and the faceplate 7.

Figure 8:
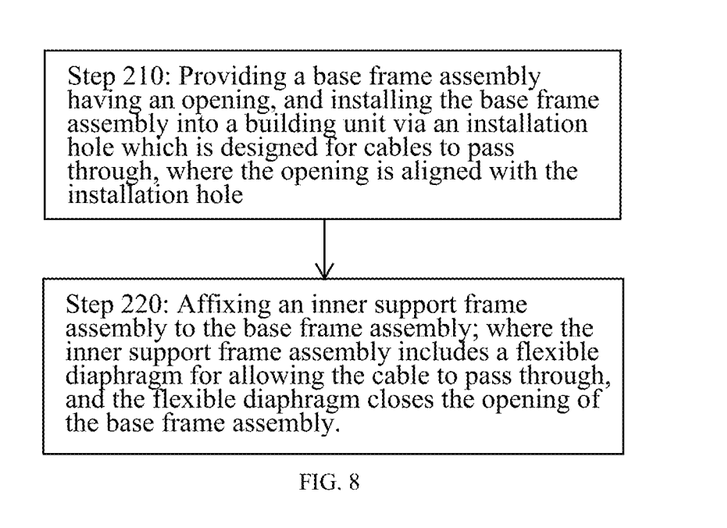
FIG. 8 illustrates an installation process of the cable management device according to an embodiment of the present invention.

FIG. 8 illustrates an installation process 200 of the cable management device according to an embodiment of the present invention. The method 200 may be used to install the cable management device 2 of FIGS. 2-8 or other cable management devices according to embodiments of the present invention. The method 200 includes steps 210 and 220.

Step 210 includes providing the base frame assembly 5 having the opening 16, and installing the base frame assembly 5 into the building unit 1 via the installation hole 3 which is designed for cables 4 to pass through, where the opening 16 is aligned with the installation hole 3.

Step 220 includes affixing the inner support frame assembly 6 to the base frame assembly 5. The inner support frame assembly 6 includes a flexible diaphragm 12 for allowing the cable 4 to pass through, and the flexible diaphragm 12 closes the opening 16 of the base frame assembly 5.

In some embodiments, step 210 may include: providing a base frame 9 which has the opening 16; coupling installation knobs 8 to the base frame 9, where the installation knobs 8 are rotatable with respect to the base frame 9, so as to affix the base frame assembly 5 to the installation hole 3 of the building unit 1.

In some embodiments, coupling the installation knobs 8 to the base frame 9 may include: passing connectors 10 through the base frame 9 and connecting them to the installation knobs 8, where the connectors 10 can drive the installation knobs 8 to rotate.

In some embodiments, providing the base frame 9 having the opening 16 includes: providing the base frame 9 having blocking members 17, where the blocking members 17 function to stop further rotation of the installation knobs 8 with respect to the base frame 9. When the installation knobs 8 are rotated to positions against the blocking members 17, the installation knobs 8 extend outside of the side edges of the base frame 9, and in this condition, turning the connectors 10 further causes the installation knobs 8 to move in an axial direction of the connectors 10.

In some embodiments, the inner support frame assembly 6 includes an inner support frame 11 having an opening 19, and the flexible diaphragm 12 can be formed on the inner support frame 11 by at least one of mounting, welding, adhering, and overmolding methods, to cover the opening 19. Affixing the inner support frame assembly 6 to the base frame assembly 5 includes connecting the inner support frame 11 to the base frame 9 by connectors 13.

In some embodiments, the method 200 may further include: affixing a faceplate 7 to the base frame assembly 5 or the inner support frame assembly 6, so that the inner support frame assembly 6 is sandwiched between the base frame assembly 5 and the faceplate 7, where an opening 24 of the faceplate 7 exposes the flexible diaphragm 12.

Figure 9:
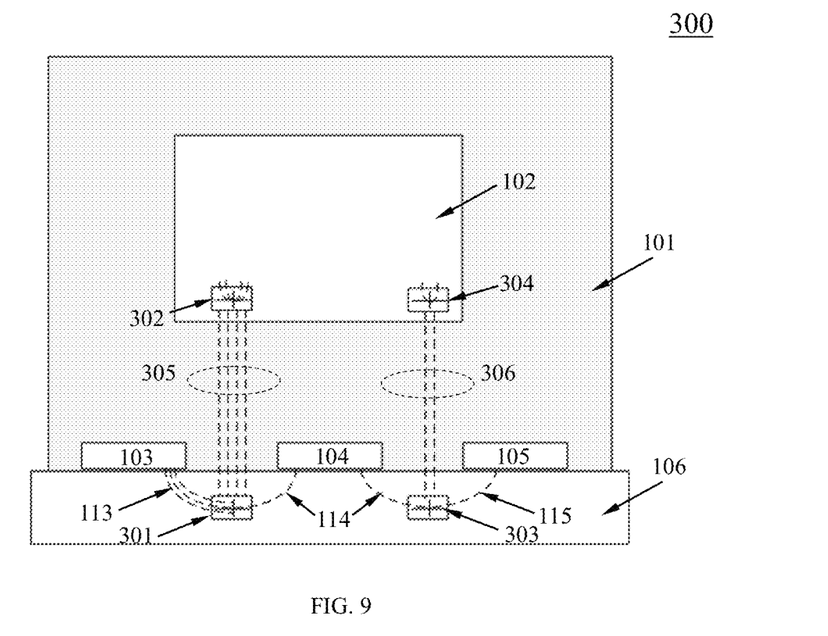
FIG. 9 illustrates an exemplary use scenario of the cable management device according to embodiments of the present invention.

FIG. 9 illustrates an exemplary use scenario 300 of the cable management device according to embodiments of the present invention. The scenario 300 is similar to the scenario 100 of FIG. 1, but employs multiple cable management devices 301-304 to achieve cable connections between the television 102 mounted on the wall 101 and the multiple electronic devices 103-105 that are placed, for example, on the piece of furniture 106. The cable management devices 301-304 may be any one of the devices described above with reference to FIGS. 2-8. In the illustrated example, the cables 113 and 114 of the devices 103 and 104 are connected to the television 102 via cable management devices 301 and 302 provided on the installation holes located on the wall 101, and likewise the cables 114 and 115 of the devices 104 and 105 are connected to the television 102 via the cable management devices 303 and 304, so that most parts of the cables are not exposed, but rather, are routed inside the wall 101 in a hidden manner, as indicated by the dashed lines 305 and 306. This avoids the crisscrossing of exposed cables, dust collection, and knotting of the cables; improves aesthetics; and facilitates organization, replacement, maintenance and cleaning of the cables. Preferably, the multiple cable management devices 301-304 may be arranged at concealed locations depending on the locations of the television 102 and electronic devices 103-105. In the illustrated example of FIG. 9, the cable management devices 301 and 303 are concealed behind the furniture 106, and the cable management devices 302 and 304 are concealed behind the television 102.

While the present invention is described above using specific examples, these examples are only illustrative and do not limit the scope of the invention. It will be apparent to those skilled in the art that various modifications, additions and deletions can be made to the cable management device of the present invention without departing from the spirit or scope of the invention.

The invention claimed is:

1. A cable management device configured to be installed in an installation hole of a building unit to pass a cable, the cable management device comprising:
   a base frame assembly, configured to be installed to the building unit around the installation hole, the base frame assembly defining an opening configured to be aligned with the installation hole, wherein the base frame assembly includes:
      a base frame defining the opening; and
      a plurality of installation knobs coupled to the base frame, wherein the installation knobs are rotatable with respect to the base frame and are configured to affix the base frame to the installation hole of the building unit; and
   an inner support frame assembly, affixed to the base frame assembly, the inner support frame assembly including a flexible diaphragm configured for passing the cable, the flexible diaphragm covering the opening of the base frame assembly.

2. The cable management device of claim 1, wherein each installation knob is rotatable between a first position and a second position, wherein in the first position, the installation knob extends beyond an edge of the base frame, and in the second position, the installation knob is within the edge of the base frame.

3. The cable management device of claim 1, wherein the installation knobs are a pair of claws disposed opposite to each other.

4. The cable management device of claim 1, wherein the base frame assembly further includes a plurality of connectors, wherein each connector passes through the base frame and is connected to a corresponding one of the plurality of connectors, and is configured to drive the connector to rotate.

5. The cable management device of claim 4, wherein the base frame further includes a plurality of blocking members, wherein each blocking member is disposed to stop further rotation of a corresponding one of the installation knobs with respect to the base frame, wherein when the installation knob is at a position that abuts the corresponding blocking member, the installation knob extends beyond the edge of the base frame and is configured to be driven by the corresponding connector to move in an axial direction of the connector.

6. The cable management device of claim 1, wherein the base frame further includes a plurality of positioning holes, configured to position the cable management device on a surface of the building unit.

7. The cable management device of claim 1, wherein the inner support frame assembly includes:
   an inner support frame having an opening; and
   a plurality of connectors configured to affix the inner support frame to the base frame;
   wherein the flexible diaphragm is formed on the inner support frame by at least one of removeable coupling, welding, adhering, or overmolding to cover the opening of the inner support frame.

8. The cable management device of claim 1, wherein the flexible diaphragm defines a flexible opening configured to allow the cable to pass through.

9. The cable management device of claim 8, wherein the flexible opening includes cut slits.

10. The cable management device of claim 8, wherein the flexible opening is formed of a flexible material and is deformable.

11. The cable management device of claim 9, wherein the flexible opening includes flexible blades which are biased to closed positions to close the flexible opening and allow the cable to pass through.

12. The cable management device of claim 1, further comprising:
- a faceplate which defines an opening to expose the flexible diaphragm,
- wherein the inner support frame assembly is sandwiched between the base frame assembly and the faceplate.

13. A method for installing a cable management device, comprising:
- (a) providing a base frame assembly having an opening, and installing the base frame assembly into a building unit via an installation hole which is configured for cables to pass through, wherein the opening is aligned with the installation hole, including
  - (a1) providing a base frame which has the opening; and
  - (a2) coupling a plurality of installation knobs to the base frame, and rotating the installation knobs with respect to the base frame to affix the base frame to the installation hole of the building unit; and
- (b) affixing an inner support frame assembly to the base frame assembly, wherein the inner support frame assembly includes a flexible diaphragm configured to allow the cable to pass through, and the flexible diaphragm closes the opening of the base frame assembly.

14. The method of claim 13, wherein step (a2) includes passing a plurality of connectors through the base frame and connecting them to the installation knobs, and turning the connectors to drive the installation knobs to rotate.

15. The method of claim 14, wherein step (a) further includes:
- providing a plurality of blocking members on the base frame, where the blocking members are configured to stop further rotation of the installation knobs with respect to the base frame;
- rotating the connectors to rotate the installation knobs to positions abutting the blocking members, where the installation knobs extend outside of the side edges of the base frame; and
- while the installation knobs are at positions abutting the blocking members, further rotating the connectors to move the installation knobs in an axial direction of the connectors.

16. The method of claim 13, wherein the inner support frame assembly includes an inner support frame having an opening, and wherein the flexible diaphragm is formed on the inner support frame by at least one of mounting, welding, adhering, and overmolding methods, to cover the opening of the inner support frame; and
- wherein affixing the inner support frame assembly to the base frame assembly includes connecting the inner support frame to the base frame by a plurality of connectors.

17. The method of claim 13, further comprising:
- affixing a faceplate to the base frame assembly or the inner support frame assembly, wherein the inner support frame assembly is sandwiched between the base frame assembly and the faceplate, and wherein an opening of the faceplate exposes the flexible diaphragm.

* * * * *